Jan. 10, 1928.

W. F. WOOLARD 1,655,930

OIL REFINING STILL AND METHOD OF MAKING THE SAME BY ELECTRIC ARC WELDING

Filed Feb. 27, 1926

WITNESS:
Fred Palm
DEL.

INVENTOR.
WILLIAM F. WOOLARD
BY
Erwin, Wheeler & Woolard
ATTORNEYS.

Patented Jan. 10, 1928.

1,655,930

UNITED STATES PATENT OFFICE.

WILLIAM F. WOOLARD, OF WAUWATOSA, WISCONSIN, ASSIGNOR TO A. O. SMITH CORPORATION, OF MILWAUKEE, WISCONSIN, A CORPORATION OF NEW YORK.

OIL-REFINING STILL AND METHOD OF MAKING THE SAME BY ELECTRIC-ARC WELDING.

Application filed February 27, 1926. Serial No. 91,221.

The invention relates to stills of huge proportions made from excessively thick metal plates employed in refining crude oils, and also to a method by the practice of the steps of which it is now rendered possible to construct stills embodying the invention in its concrete form. The invention resides in a still, and method of its manufacture, of the type disclosed in the application by L. R. Smith, filed Dec. 31, 1924, Serial No. 758,994, for which Patent No. 1,577,410, was granted March 16, 1926. The specification of the patent referred to sets forth in a full manner the insurmountable difficulties which heretofore have been encountered in attempts made to manufacture satisfactory and efficient stills of the present type, such difficulties existing by reason of certain physical limitations inseparable from and imposed upon such manufacture by the methods heretofore known and practiced. Reference may be had to the said specification for an explanation of the difficulties and limitations attending the practice of the prior art.

In manufacturing stills of the present type under methods as practiced heretofore, it has been impossible to weld over-lapping metal plates having a thickness exceeding one and one-half inches, by reason of the inability to heat such plates uniformly. In such previous attempts as have been made to forge or hammer weld over-lapping plates of excessive thickness in constructing a still, the thin, scarfed edges of the plate to which the flame was applied was unavoidably burned before the heat had penetrated the metal sufficiently to create the desired degree of fusion in the plate in the adjacent regions of thicker metal. As a consequence, the unsatisfactory results which have followed such attempts have established restrictions which served to defeat the demand for stills constructed in accordance with the patented invention and that herein set forth.

The present invention is embodied in a still having a length of about forty feet and a diameter of about five feet or less, made from steel slabs having a thickness of two and one-half or three inches, or more.

In the manufacture of stills in accordance with the invention, the excessively thick slabs, which may be five or more feet wide and of a length proportioned to the diameter of the still to be produced, are rolled into annular or tubular form with the abutting ends of the slab meeting in the same circular line. Such ends at their meeting line are machined so as to remove a portion of the metal and form a deep welding groove extending parallel to the axis of the tubular member. The metal in the region of the groove at the meeting ends or edges is then fused in the desired degree by an electric arc which plays in the said groove. I prefer to conduct the arcing current by a fusible weldrod, the molten metal in the form of welding material flowing from the weldrod being deposited in the welding groove and amalgamating with the fused meeting ends of the slab to form an integral endless ring or still section without a joint, such as was always produced in the practice of the older forge method of lapwelding the necessarily thinner plates.

In the further operation of constructing the still, a plurality of such integral rings formed and constructed in the manner described are assembled end to end and in axial alignment, such rings being fused at the meeting lines of their ends so as to unite the several rings or still sections into an integral tubular structure of the desired length, without joints. Preparatory to or after the assembly of the several annular ring sections in axial alignment, I machine their ends by cutting away a portion of the metal in circumferential zones so that when two sections are aligned in abutting relation, a circular welding groove is provided, and by means of an electric arc, preferably conducted by a fusible weldrod, I fuse the ends of the ring sections in the region of their meeting lines, and fill the welding grooves with molten metal flowing from the weldrod, so as to unite the several sections and complete the structure as an integral tube without any joints, such as heretofore have constituted a serious objection.

The long tube so constructed is completed as a closure by attaching suitable heads thereto, which heads are connected to the ends of the main tubular body through the provision of similar circumferential welding grooves, permitting the fusion of the parts at their meeting lines, and the filling of such grooves by the deposit of molten metal flowing from destructible weldrods, as before described, to produce the integral structure.

The several annular sections and the heads which are embodied in the construction, are accurately produced in accordance with predetermined calculations so that perfect symmetry in the still is assured. Arc-welding permits the merger of the elements into an integral structure wholly free from distorted proportions, and in this respect the still constructed in accordance with my invention is greatly advantageous over forged or hammer welded stills, in which distortion in the lap-welded seams or joints is occasional. Better results are secured when the main body of the still is constructed as a true cylinder, inasmuch as the action of the agitators and scrapers disposed interiorly of the still are enabled thereby to function more perfectly.

The molten metal deposited in the fusion of the destructible weldrods in filling the welding grooves, may be augmented with economy in the more costly weldrod material by placing slugs of additional welding material in the welding grooves, such slugs being fused by the action of the electric arc and amalgamated with the fused metal of the still in the region of the meeting lines. I find it best to employ the metallic-arc process and to use covered metallic weldrods for well-known reasons, but my improved method may be carried out by employing a carbon arc, and increasing the quantity of additional welding material sufficiently to fill the welding grooves at the time that the complete fusion and amalgamation take place. It is not intended that the uses of the invention shall be restricted to that mentioned.

The invention will now be described more in detail, and the novelty thereof will be pointed out in the appended claims.

Figure 1:
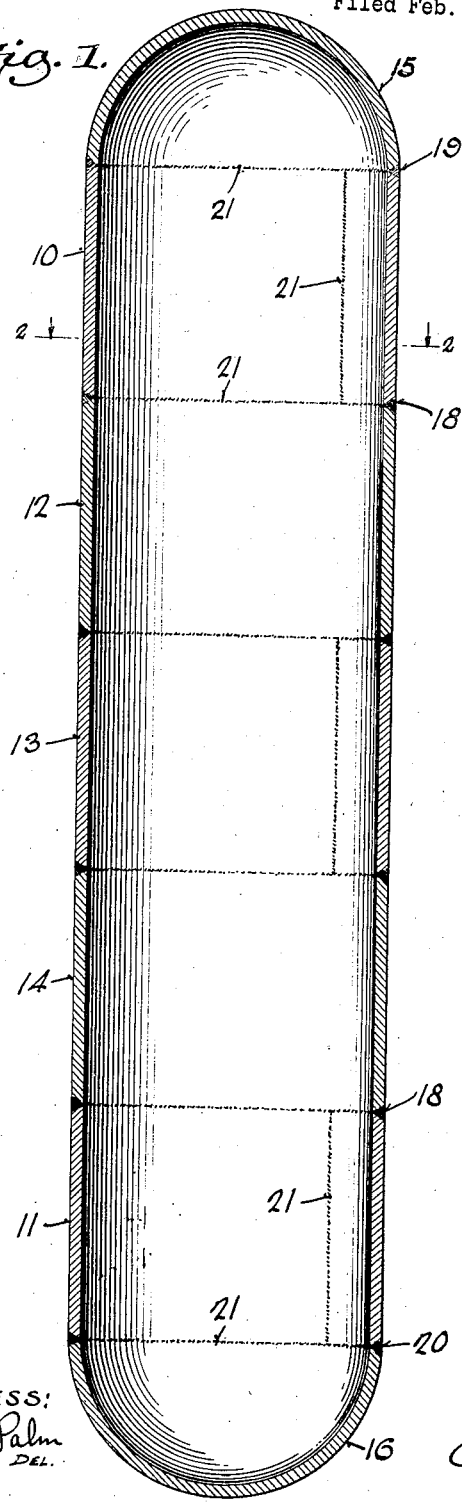
Figure 1 is a vertical or longitudinal, central, sectional view through a still constructed in accordance with my invention.

In the drawing, the still is shown as composed of annular end sections 10 and 11, and with like intermediate sections 12, 13, and 14, arranged end to end and aligned longitudinally, and with closing end pieces or heads 15 and 16, arranged upon the end sections of the cylindrical body formed by the assembly of the several annular sections, the several elements entering into the construction of the still being fused together at their meeting lines by an electric arc so as to constitute a closed integral tubular structure, without joints, such as are present in the older type of stills produced by hammer welding. The number of annular sections to be incorporated in the still will be determined by the length of the latter, and so it will be understood that while the arrangement shown is merely illustrative, such arrangement may be varied to meet the requirements of particular cases.

As outlined hereinbefore, the several annular sections forming the main tubular or body portion of the still, are made from excessively thick plates. Such plates will have a thickness of two and one-half or three inches, or even greater, and conveniently be of a width of about five feet. The length of these excessively thick plates will be equal to the circumference of the still, and consequently such length will be determined by the diameter of the still which it is desired to construct. The thick plates are rolled into annular form, with their ends meeting and abutting in the same circular line, after which the said meeting ends are fused by an electric arc so to make an integral ring structure.

On account of the excessive thickness of the metal plates, and the inability of the heat generated by the arc to penetrate the gap between the meeting ends sufficiently to fuse the latter, a deep welding groove with a thin bottom of metal is formed in the line of such meeting ends by machining away portions of the metal, so that the point of the fusible weldrod may be entered in the said groove, and by playing the electric arc upon the metal forming the bottom and sides of the groove, so perfectly fuse such ends that the latter and the molten metal flowing from the weldrod to fill the groove, as indicated by the numeral 17, will become amalgamated as one piece.

Figure 2:
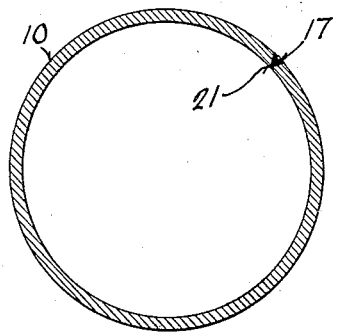
Fig. 2 is a horizontal or transverse sectional view of the same, on the line 2—2, Fig. 1.

The form of the groove is not material. It may be U-shaped, V-shaped or otherwise, and while preferably formed so as to open from the exterior surface of the annulus as shown in Fig. 2, it may be formed at the inside, as well; or upon both sides, in which case the bottom of the oppositely disposed grooves will be formed by the undisturbed metal at or near the central line of the thick plate in which the two grooves are formed.

A suitable number of ring sections 10—14 produced in the manner described and fused at the line 17 into integral annular structures, are assembled end to end in axial alignment, and are united by the action of an electric arc which fuses such ends in the region of their meeting lines. To enable this last described welding operation to be effected satisfactorily, it is necessary that welding grooves produced in the manner before described be provided. Such grooves may be formed by machining either before or after the assembly of the ring sections in alignment, or the longitudinal edges of the thick plates may be beveled or scarfed at the time of rolling the slabs, so that when the ring sections are formed and assembled, the welding grooves are produced, and a considerable amount of machining obviated thereby. The integral annular sections may also be produced by perforating an ingot and expanding it to the required diameter, preserving the necessary thickness of its walls at the same time. After assembly, the electric arc is made to travel circumferentially with relation to the ring sections, as by effecting the rotation of the latter, and by fusing the metal of the ends in the region of the grooves, will cause the adjacent sections to be united to each other, as indicated by the numeral 18.

Suitable heads 15, and 16, herein shown as hollow hemispheres, previously produced from metal plates having a thickness approximately that of the plates forming the ring sections, are fused to the opposite ends of the tubular structure, as indicated by the numerals 19 and 20, to complete the closure.

To enable the heads 15 and 16 to be united to the main body section of the still, circumferential welding grooves will be formed, and the fusion carried out in the manner previously described.

As before indicated, the particular cross sectional contour of the welding groove is not material, but it should be so formed that the metal 21 remaining at the bottom of the groove will be comparatively thin so as to admit of ready penetration and easy fusion by the heat of the electric arc, when the latter is played thereon, and so insure a complete fusion of the metal at the bottom of the groove, as a beginning to the welding operation. On account of the excessive thickness of the plates, traverse of the weld-rod a number of times over the work will be required to fill the deep welding grooves by the deposit of successive layers of welding material flowing from the destructible weldrods, and fused into the integral structure. In assembling the annular sections end to end, the welded lines formed at the meeting ends of the bent metal plates, should be disaligned, as indicated in Fig. 1, so as to distribute the internal expansive stresses.

Figure 3:
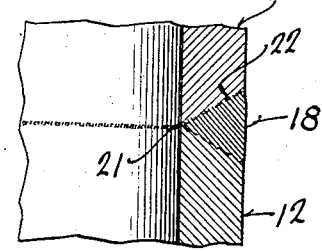
Fig. 3 is a detail showing one form of welding groove, and illustrating the manner in which the arc-welding may be performed.
Figure 4:
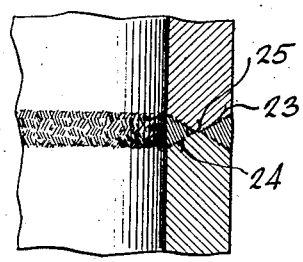
Fig. 4 is a like view showing another formation of welding groove.

In Fig. 3 I have illustrated a welding groove 22 formed entirely at one side of the sections to be united, the bottom 21 of the groove being at the inside, while in Fig. 4 I have shown welding grooves 23 and 24 formed at opposite sides of the sections to be united, with a common bottom 25 for both grooves. In the latter case, the welding is performed at both the outside and inside of the tube. When the welding groove formation is as illustrated in Fig. 4, an economy of about 50 per cent in the consumption of welding material is effected.

An economy in the weldrod material, which is especially prepared for this work, may be effected by placing in the welding grooves rods or slugs of suitable metals to form additional welding material, such rods or slugs being fused by the electric arc and amalgamated into the structure. While I prefer the metallic-arc method of welding, it will be within the scope of my invention to use the carbon-arc method. The fused union effected in the practice of the process has been demonstrated by actual test to have a tensile strength which exceeds that of the material in which it is formed.

The closed vessel in practice will be provided with inlet and outlet connections usual to structures of this nature, but the manner of their attachment is not concerned in the present invention.

Although in the foregoing I have described one particular application of my invention, it is to be understood that the invention is not to be limited to closure vessels designed for the use specified, but that it may be utilized in the manufacture of similar structures applicable to other purposes. The improved method of manufacture hereinbefore set forth has served to greatly expedite the production of stills of the present type, in that the fusion of the parts by means of an electric arc may be effected much more rapidly than by the action of a flame, as in hammer-welding.

Having thus described my invention, what I claim and desire to secure by Letters Patent of the United States, is:

1. A still for use in refining oil, composed of a plurality of annular metal sections of excessive thickness aligned longitudnially with their ends abutting and fused and welded at their circumferential meeting lines by an electric current into an integral elongated tubular structure, and heads of like thickness fused and welded by an electric current to the ends of the tubular structure to complete the closure.

2. A still for use in refining oil, embodying a plurality of annular sections constituted from metal plates of excessive thickness each bent to form a tube and welded electrically in the line of its meeting ends, such annular sections being aligned longitudinally with their ends abutting and fused and welded circumferentially at their meeting ends by an electric current into an integral tubular structure.

3. A still for use in refining oil, composed of a plurality of annular sections constituted from metal plates of excessive thickness each bent to form a tube and welded electrically in the line of its meeting ends, such annular sections being aligned longitudinally with their ends abutting and fused and welded electrically circumferentially at their meeting ends into an integral tubular structure, and heads of like thickness fused and welded electrically to the ends of the tubular structure to complete the closure.

4. In the manufacture of stills of extreme dimensions for use in oil distillation, the method which comprises the steps of bending metal plates of extreme thickness into annular sections with the ends of each plate meeting in the same circular line, fusing and welding the said meeting ends by an electric current to form an integral tubular section, assembling a plurality of such integral tubular sections with their ends abutting in axial alignment, fusing and welding the abutting ends of the several sections by an electric current to constitute an integral tubular structure, applying heads to the opposite ends of the tubular structure, and fusing and welding such heads to the ends of the tubular structure by an electric current to complete the closure.

5. In the manufacture of stills of extreme dimensions for use in oil distillation, the method which comprises the steps of bending metal plates of extreme thickness into annular sections with the ends of each plate meeting in the same circular line, forming a welding groove in the line of the meeting ends, conducting an arcing current to fuse and weld the metal in the region of the groove and form an integral tubular section, assembling a plurality of such integral tubular sections with their ends abutting in axial alignment, providing circumferential welding grooves at the meeting lines of adjacent sections, fusing and welding the metal of the several sections in the region of the circumferential welding grooves by an electric arc to constitute an elongated integral tubular structure, applying heads to the opposite ends of the tubular structure and fusing and welding such heads to the ends of the tubular structure by an electric arc to complete the closure, and depositing molten metal in the welding grooves to fill the latter as the welding proceeds.

6. In the manufacture of stills of extreme dimensions for use in oil distillation, the method which comprises the steps of bending metal plates of extreme thickness into annular sections with the ends of each plate meeting in the same circular line, forming a welding groove in the line of the meeting ends, fusing and welding the metal in the region of the said groove by an electric arc to form an integral tubular section, assembling a plurality of such integral tubular sections with their ends abutting in axial alignment, providing circumferential welding grooves at the meeting lines of adjacent sections, fusing and welding the metal of the several sections in the region of the circumferential welding grooves by an electric arc to constitute an elongated integral tubular structure, applying heads to the opposite ends of the elongated tubular structure and fusing such heads to the ends of the tubular structure by an electric arc to complete the closure, and filling the welding grooves by the deposit of molten welding material flowing from the fusible current conducting weldrod together with that supplied from an independent source.

In testimony whereof, I have signed my name at Milwaukee, this 24th day of February, 1926.

W. F. WOOLARD.